(12) United States Patent
Massis (10) Patent No.: US 10,455,823 B1
(45) Date of Patent: Oct. 29, 2019

(54) TICK TRAP BELT

(71) Applicant: Jeffery Thomas Massis, Endicott, NY (US)

(72) Inventor: Jeffery Thomas Massis, Endicott, NY (US)

( * ) Notice: Subject to any disclaimer, the term of this patent is extended or adjusted under 35 U.S.C. 154(b) by 0 days.

(21) Appl. No.: 16/411,725

(22) Filed: May 14, 2019

Related U.S. Application Data (63) Continuation-in-part of application No. 15/952,737, filed on Apr. 13, 2018.

(51) Int. Cl.
*A01M 1/14* (2006.01)
*A41F 9/00* (2006.01)

(52) U.S. Cl.
CPC .............. *A01M 1/14* (2013.01); *A41F 9/002* (2013.01); *A01M 2200/011* (2013.01)

(58) Field of Classification Search
CPC .. A41F 9/002; A41F 9/02; A41F 9/025; A41F 17/04; A41D 17/00; A41D 17/005; A41D 17/02; A41D 17/04; A01M 1/14; A01M 1/18; A01M 1/103; A01M 23/005; A01M 2200/011
USPC .......................... 43/121; 2/300, 309, 311, 338
See application file for complete search history.

(56) References Cited

U.S. PATENT DOCUMENTS

| | | | | |
|---|---|---|---|---|
| 691,546 A * | 1/1902 | Hubbell | .............. | A01M 1/18 43/108 |
| 784,684 A * | 3/1905 | Karlsen | .............. | A01M 1/18 43/108 |
| 1,200,920 A * | 10/1916 | Boughton | .............. | A01M 1/18 43/108 |
| 1,335,845 A * | 4/1920 | Long | .............. | A01M 1/18 43/108 |
| 1,528,663 A * | 3/1925 | Fernandes, Jr. | .......... | A01M 1/18 47/32.5 |
| 2,253,541 A * | 8/1941 | Torbett | .............. | A01M 1/18 43/108 |
| 2,911,756 A * | 11/1959 | Geary | .............. | A01M 1/02 43/114 |
| 4,471,561 A * | 9/1984 | Lapierre | .............. | A01M 1/04 361/232 |
| 4,631,753 A * | 12/1986 | Ehring | .............. | A41D 27/10 2/124 |
| 4,802,302 A * | 2/1989 | Alnafissa | .............. | A01K 5/0142 119/61.53 |

(Continued)

*Primary Examiner* — Jameson D Collier
*Assistant Examiner* — Heather N Mangine
(74) *Attorney, Agent, or Firm* — Dale J. Ream (57) ABSTRACT

A tick trap belt for wear by an outdoorsman for stopping upward movement of ticks includes a belt having opposed ends, each end having a fastener such that the opposed ends of the belt are selectively secured about a user's body. The belt includes upper and lower edges and has opposed inner and outer surfaces extending between the upper and lower edges, respectively. The tick trap belt includes an awning or cover coupled to the upper edge of the belt and extends along the upper edge between the fasteners at the opposed ends thereof, respectively. The awning extends outwardly and downwardly away from the upper edge, the awning having a bottom surface that, in cooperation with the outer surface of the belt, defines a gap area. An adhesive member is positioned in the gap area for stopping movement of ticks who step thereon.

14 Claims, 11 Drawing Sheets

(56) References Cited

U.S. PATENT DOCUMENTS

| | | | | |
|---|---|---|---|---|
| 4,876,823 A * | 10/1989 | Brunetti | A01M 1/14 | 43/114 |
| 4,881,671 A * | 11/1989 | Horton | A01M 1/20 | 224/222 |
| 4,991,234 A * | 2/1991 | Greenberg | A41D 20/00 | 2/16 |
| 5,005,215 A * | 4/1991 | McIlquham | A41D 13/001 | 119/654 |
| 5,022,179 A * | 6/1991 | Olson | A01M 1/14 | 43/114 |
| 5,155,950 A * | 10/1992 | Burgeson | A01M 1/14 | 43/121 |
| 5,303,523 A * | 4/1994 | Hand | A01G 13/105 | 119/61.53 |
| 5,381,557 A * | 1/1995 | Luria | A01M 1/14 | 2/16 |
| 5,454,186 A * | 10/1995 | Gang | A01M 1/14 | 43/114 |
| 5,758,366 A * | 6/1998 | Wilson | A41F 9/02 | 2/311 |
| 5,918,427 A * | 7/1999 | VanderWerf | A01M 1/24 | 52/100 |
| 6,141,802 A * | 11/2000 | Drake | A41D 1/06 | 2/22 |
| 6,223,463 B1 * | 5/2001 | Carlson | A01G 13/105 | 43/108 |
| 6,253,384 B1 * | 7/2001 | Valentino | A41F 9/00 | 2/229 |
| 6,353,939 B1 * | 3/2002 | Arber | A41D 17/02 | 2/242 |
| 6,651,257 B2 * | 11/2003 | Smith | A41B 11/00 | 2/239 |
| 9,828,707 B2 * | 11/2017 | Patton | B32B 5/022 | |
| 9,901,088 B2 * | 2/2018 | Backmark | A01M 1/2011 | |
| 2005/0235397 A1 * | 10/2005 | Cosenza | A01M 1/14 | 2/242 |
| 2009/0272023 A1 * | 11/2009 | Ramos-Santiago | A01M 29/12 | 43/121 |
| 2010/0043275 A1 * | 2/2010 | Battick | A01M 1/14 | 43/114 |
| 2013/0067796 A1 * | 3/2013 | Dong | A01M 1/14 | 43/109 |
| 2013/0111802 A1 * | 5/2013 | Oehlschlager | A01M 1/14 | 43/114 |
| 2013/0255134 A1 * | 10/2013 | Robinson | A01M 1/02 | 43/114 |
| 2013/0291275 A1 * | 11/2013 | Radefeldt | A41D 13/001 | 2/24 |
| 2014/0208485 A1 * | 7/2014 | Kjar | A41D 1/21 | 2/312 |
| 2016/0021955 A1 * | 1/2016 | Rich | A41F 17/04 | 2/231 |
| 2016/0302404 A1 * | 10/2016 | Young | A01M 29/34 | |
| 2018/0077917 A1 * | 3/2018 | Mailleux | A01M 1/103 | |

\* cited by examiner

TICK TRAP BELT

REFERENCE TO RELATED APPLICATIONS

This application is a continuation-in-part (CIP) of and claims the benefit of U.S. patent application Ser. No. 15/952,737 filed Apr. 13, 2018 and titled Tick Trap Belt and which is incorporated herein by reference in its entirety.

BACKGROUND OF THE INVENTION

This invention relates generally to insect repelling devices and, more particularly, to a belt to be worn about the waist of an outdoorsman that traps ticks on an adhesive surface positioned in a V-shaped gap area so as to prevent ticks from lodging in the skin of the outdoorsman.

In certain parts of the country, it is common for a hunter or outdoorsman to experience a tick having crawled onto his skin and taken up residence. A tick is a small arachnid that survives by feeding on the blood of mammals. While ticks are most common lodged in the skin of dogs and similar animals, ticks also crawl their way onto a human when they have opportunity to do so and bite tightly into his skin whereby to access blood. Without making a thorough inspection of one's body after walking through a tick-rich wooded or brushy area, one or more ticks may be hosted by a person's body for hours or even days. As ticks may carry Lyme disease or other diseases, preventing ticks from reaching their desired location is of great importance.

In the past, pesticides and repellants have been used to discourage ticks from crawling onto a person. Encouraging outdoorsmen to wear long pants tucked into socks and tight rubber boots is also discouraging to ticks. Although presumably effective for their intended purposes, the existing devices and proposals have not been effective to actually immobilize and kill a tick or similar arachnid that is actively crawling upwardly on the pants or other garment of an outdoorsman.

Therefore, it would be desirable to have a tick trap belt which traps and kills ticks that are crawling on the pants of an outdoorsman. Further, it would be desirable to have a tick trap belt that is easy to attach and wear about the waist of an outdoorsman, especially when the user anticipates walking through a brushy or grassy area likely to have ticks. In addition, it would be desirable to have a tick trap belt having an awning or cover extending away from the belt that includes an adhesive strip in a gap area for the purpose of trapping ticks that crawl onto the adhesive strip.

SUMMARY OF THE INVENTION

A tick trap belt according to the present invention for wear by an outdoorsman for stopping upward movement of ticks includes a belt having opposed ends, each end having a fastener such that the opposed ends of the belt are selectively coupled together about a user's body. The belt includes an upper edge and a lower edge opposite the upper edge and has opposed inner and outer surfaces extending between the upper edge and the lower edge, respectively. The tick trap belt includes an awning coupled to the upper edge of the belt and extends along the upper edge between the fasteners at the opposed ends thereof, respectively. The awning extends outwardly and downwardly away from the upper edge, the awning having a bottom surface that, in association with the outer surface of the belt, defines a gap area. An adhesive member is positioned in the gap area for stopping movement of ticks who step thereon.

In a related embodiment, the awning includes first and second awning portions, each extending from a middle axis or midpoint between upper and lower edges of the belt, respectively. The first awning portion includes a first primary panel extending from the middle axis toward the upper edge and a first auxiliary panel extending away from the first primary panel at an angle that resists crush forces. The second awning portion includes a second primary panel extending from the middle axis toward the lower edge and a second auxiliary panel extending away from the second primary panel at an angle that resists crush forces. Ticks are allowed to enter the gap areas from the top down or bottom up relative to the belt and are stopped by adhesive members in each gap area.

Therefore, a general object of this invention is to provide a tick trap belt that traps ticks as they normally move upwardly along a user's clothing, such as toward the waist of a user.

Another object of this invention is to provide a tick trap belt, as aforesaid, that includes an awning or cover extending away from the belt that defines a gap area into which ticks are likely to travel and become trapped.

Still another object of this invention is to provide a tick trap belt, as aforesaid, that includes an adhesive strip positioned in the gap area onto which ticks in the gap area become stuck.

Yet another object of this invention is to provide a tick trap belt, as aforesaid, in which the awning is flexible and movable between an open configuration at which trapped ticks may be accessible and removed and a closed configuration in which the gap area is not accessible.

Another object of this invention is to provide a tick trap belt, as aforesaid, in which the awning is crush resistant and not able to be damaged, stuck to the belt, or the like by inadvertent forces upon the awning.

A further object of this invention is to provide a tick trap belt, as aforesaid, that is inexpensive to manufacture and easy to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 6b is a sectional view taken along line 6b-6b of FIG. 6a;

FIG. 9b is a sectional view taken along line 9b-9b of FIG. 9a;

DESCRIPTION OF THE PREFERRED EMBODIMENT

A tick trap belt according to a preferred embodiment of the present invention will now be described with reference to FIGS. 1 to 11 of the accompanying drawings. The tick trap belt 10 includes a belt 20, an awning 30 coupled to an upper edge of the belt, and an adhesive member 40 positioned in a gap area 32 of the awning 30.

Figure 1:
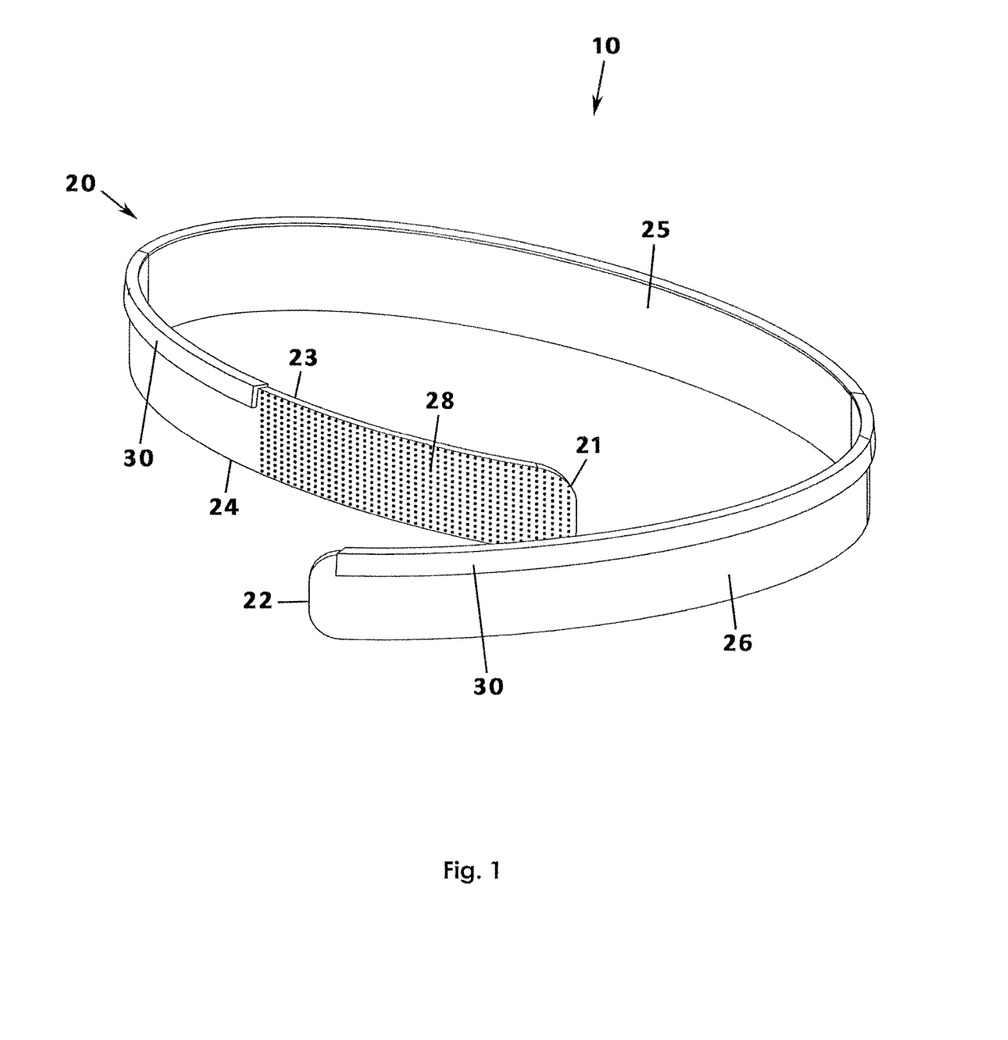
FIG. 1 is a perspective view of a tick trap belt according to a preferred embodiment of the present invention, illustrated in an unfastened configuration.
Figure 2:
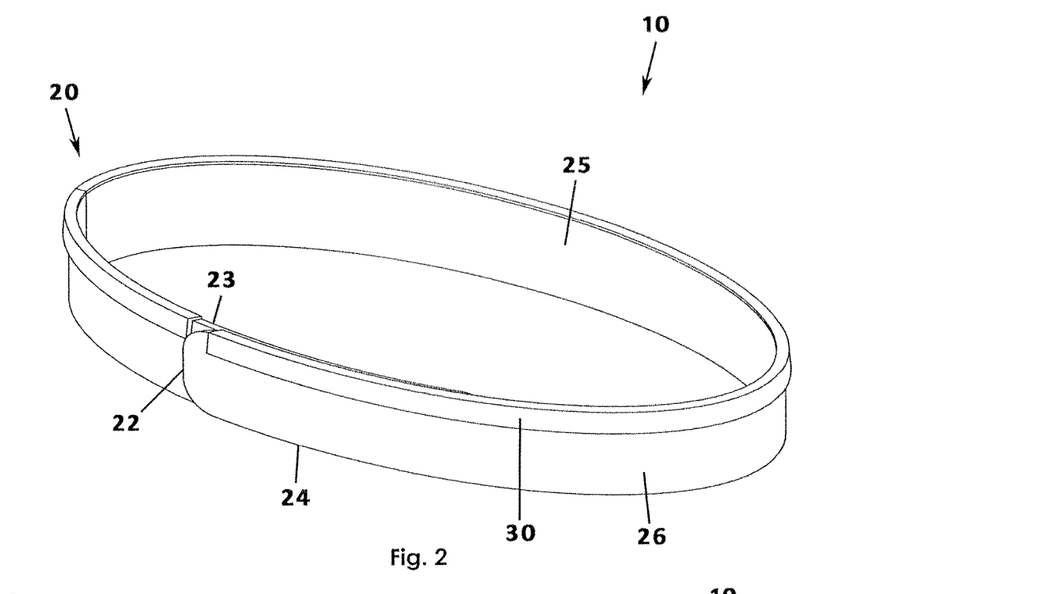
FIG. 2 is a perspective view of the tick trap belt as in FIG. 1, illustrated in a fastened configuration and with the awning in a closed or operational configuration.
Figure 3:
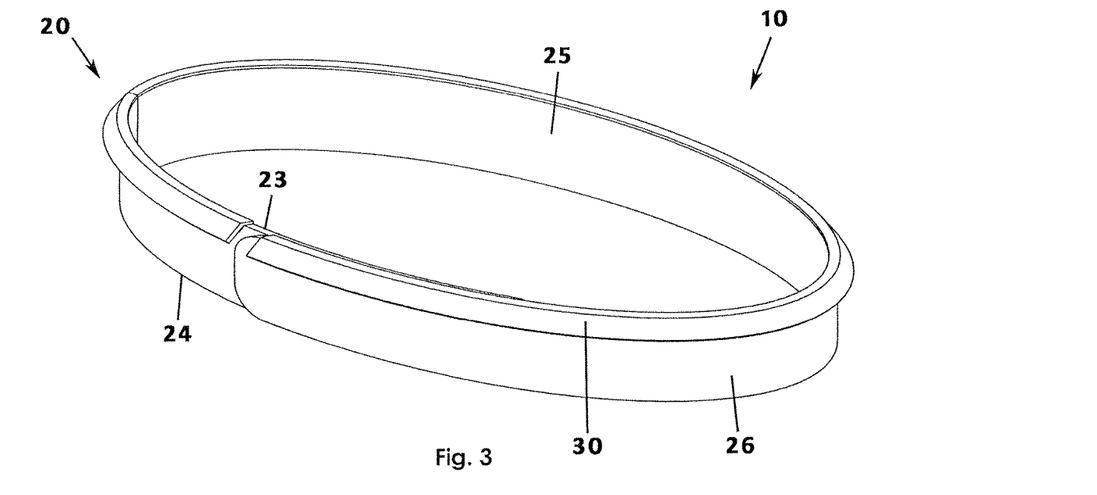
FIG. 3 is a perspective view of the tick trap belt as in FIG. 1, illustrated in a fastened configuration and with the awning in an open configuration.
Figure 4:
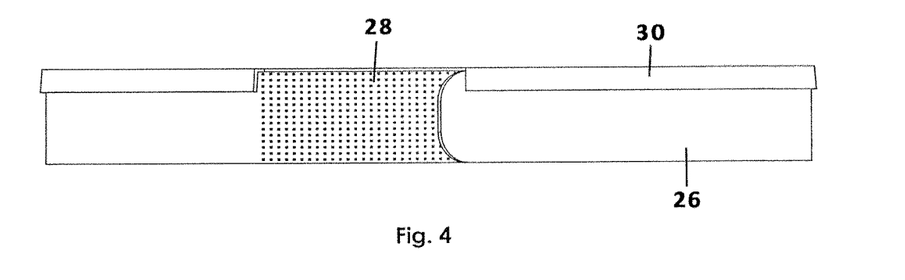
FIG. 4 is a front view of the tick trap belt as in FIG. 1.
Figure 5:
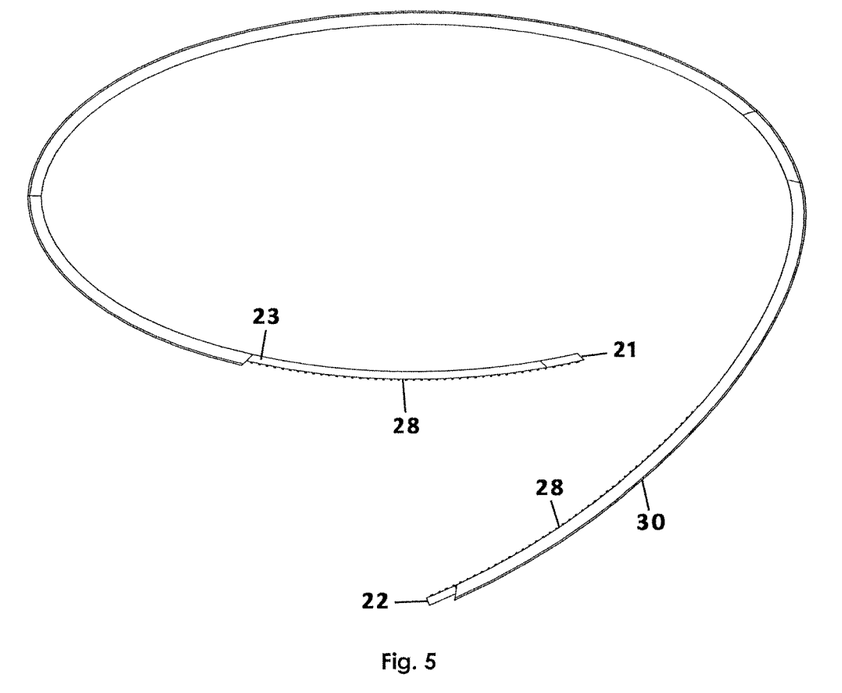
FIG. 5 is a top view of the tick trap belt as in FIG. 1.

The belt 20 includes a first end 21 and a second end 22 opposite the first end, the belt 20 having an elongate configuration and being constructed or nylon or a polymer fabric having characteristics similar to nylon although a belt made of leather, spandex, or the like may also work. The belt 20 includes a fastener 28 proximate the first end 21 and second end 22, i.e. the opposed ends, so that the belt 20 may be secured together about a user, preferably secured about the waist of an outdoorsman although the belt 20 may be dimensioned for use about a person's wrists, ankles, or the like. In an embodiment, the fasteners referred to herein are hook-and-loop fasteners positioned near the first and second ends, one on an inner surface and the other on the outer surface respectively (FIG. 1). However, other fasteners suitable for coupling the ends of the belt to one another may include a pin-and-holes arrangement, snaps, clasps, hooks, zippers an d the like.

More particularly, the belt 20 may include an upper edge 23 opposite a lower edge 24, the edges being generally parallel to one another except perhaps proximate the opposed ends. The belt 20 includes an inner surface 25 and an outer surface 26 having planar configurations extending between the upper and lower edges, respectively. In the manner of belts, the belt 20 according to the present invention has a generally longitudinal configuration having a length thereof. The belt 20 has a width, namely the distance between upper and lower edges. The relationship between the belt width and other components will be discussed later and is critical to the operability of the invention as a whole.

Figure 6A:
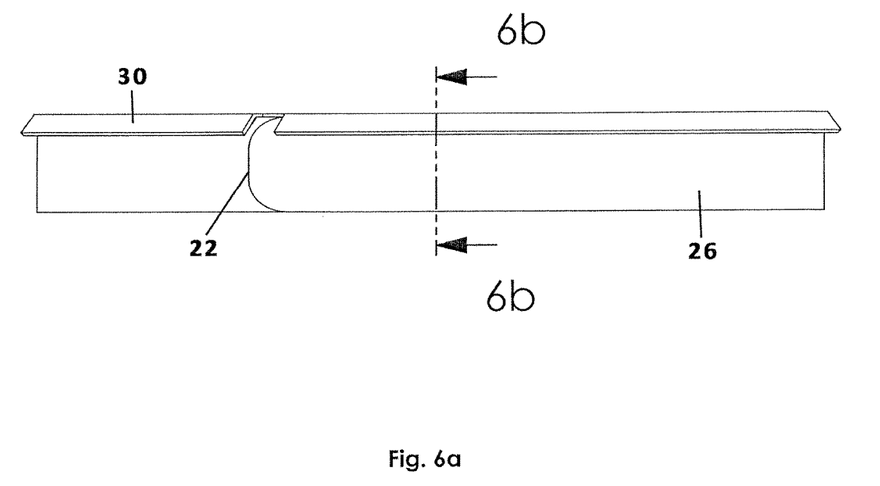
FIG. 6a is a side view of the tick trap belt as in FIG. 3.
Figure 6B:
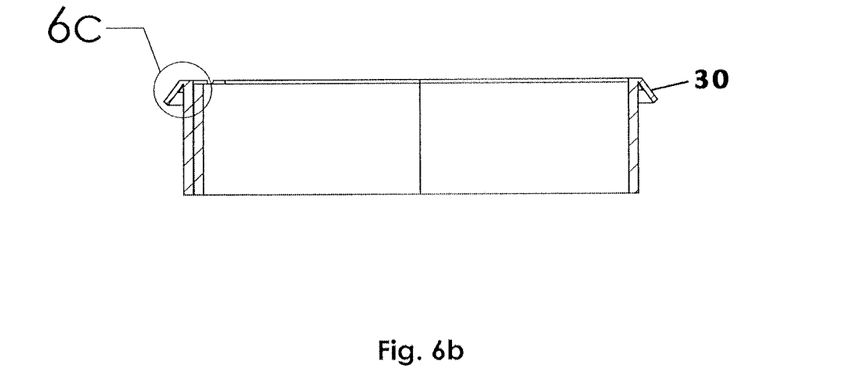
Figure 6C:
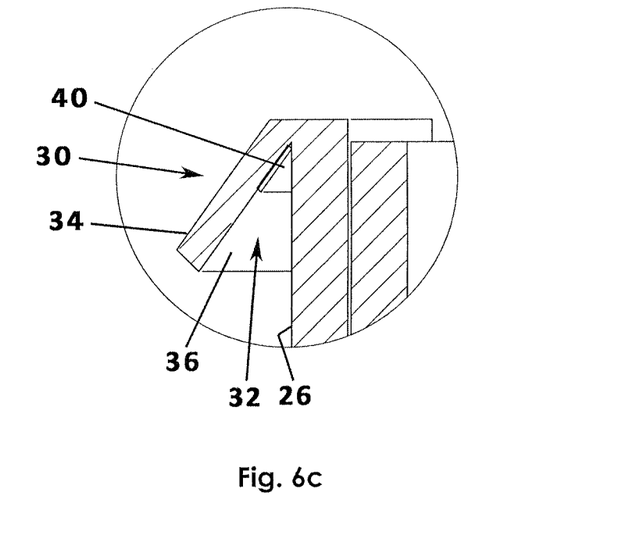
FIG. 6c is an isolated view on an enlarged scale taken from FIG. 6b.

Further, the tick trap belt 10 includes an awning 30, which may also be referred to as a cover, canopy, ceiling or the like. More particularly, the awning 30 includes a generally planar surface having a flexible construction. The awning 30 includes a top surface 34 and a bottom surface 36 opposite the top surface 34. The awning 30 is preferably constructed of a flexible material similar or the same as that of the belt itself and is, therefore, flexibly movable between a closed configuration (the operational position) extending downwardly away from the upper edge 23 of the belt 20 along and adjacent to the outer surface 26 of the belt 20 (FIGS. 6a and 6b) and an open configuration extending outwardly and downwardly from the upper edge 23 of the belt (FIG. 6c). It is understood that the adhesive member 40 positioned in the gap area 32 is not easily accessible at the closed configuration but is easily accessible at the open configuration, such as for clearing the gap area 32 of dead bugs will become apparent from the discussion later.

The adhesive member 40 is positioned in the gap area 32 and has the characteristic of being sticky such that ticks or other small arachnids crawling onto the adhesive member become stuck and eventually die of starvation. The adhesive member prevents the tick from crawling beyond the belt 20 and lodging onto the skin of a person where it would otherwise suck the person's blood. Preferably, the adhesive member is positioned and coupled to a bottom surface 36 of the awning 30 proximate and adjacent to the upper edge 23 of the belt 20. Described another way, the adhesive member 40 is positioned in the apex or uppermost area of the junction between the bottom surface 36 of the awning 30 and upper end of the outer surface 26 of the belt 20 (FIG. 6b). In an embodiment, the adhesive member 40 is positioned on only one of either the bottom surface 36 of the awning 30 or on the outer surface 26 of the belt 20. In an embodiment, the adhesive member 40 may be placed on both surfaces. Together, the gap area 32 of the awning 30 and the outer surface 26 of the belt 20 may have an inverted V-shaped configuration. However, having more of a U-shaped configuration may also work. Preferably, the adhesive member 40 is made sticky by its composition of at least two forms of glue applied together on a substrate or otherwise mixed together. The adhesive member 40 may extend the entire longitudinal length of the awning 30 and may be referred to as an adhesive strip.

The dimension and configuration of the components described above are important to achieving the operability thereof. It is understood that the awning 30 has a linear and longitudinally configuration extending between the fasteners 28 of the belt 20. In addition, the awning 30 has a width dimension that is small than a width of the belt 20—the width of the belt 20 being defined as the distance between the upper edge 23 and lower edge 24 thereof. In an embodiment, the width of the awning 30 is less than 50% of a width of the belt 20. In another embodiment, the width of the awning 30 is less than 20% of the width of the belt 20. In other embodiments, the width of the awning is shorter still. Similarly, the adhesive member 40 has a width that preferably is less than 20% of a width of the awning 30.

In use, ticks or other arachnids are known to travel up a person's clothing until reaching a point where it is feasible to come into contact with a person's skin, i.e. such as near the waist of a person where clothing is loose. But in the present invention, a tick is likely to travel upwardly on the outer surface 26 of the belt 20 where it will come into contact with the bottom surface 36 of the awning 30 and become stuck in the adhesive member 40. The belt may be attached about a user's waist, wrists, ankles, or the like.

Another embodiment of the tick trap belt 100 will now be described in detail with specific reference to FIGS. 7 to 11 and has a construction that is substantially similar to that first described above except as otherwise noted below. The same reference numerals will be used for structures remaining the same and additional reference numerals are used to reference additional structures.

The tick trap belt 100 according to the alternative embodiment also includes a belt 20 having a construction substantially as described above. Notably, the awning according to an embodiment includes specific structures causing ticks to become trapped whether coming from a bottom of the belt 20 or from the top of the belt 20. Further, the awning has a construction that resists or even prevents being crushed accidentally, such as when the outdoorsman may lean against an object that may otherwise damage an adhesive member or simply cause the belt 20 and awning to stick to one another and, as a result, not function as described and intended.

Now with specific reference to the awning according to the present embodiment, the awning includes a first awning portion 110 and a second awning portion 120 configured and operable to stop ticks from traveling downwardly from the upper edge 23 or upwardly from the lower edge 24 of the belt 20. The belt 20 defines a midpoint between the upper edge 23 and lower edge 24. Extending that midpoint linearly between opposed ends of the belt defines a middle axis (also referred to as an "imaginary" middle axis in that there may not be any markings denoting the axis despite its geometric existence.

Figure 7:
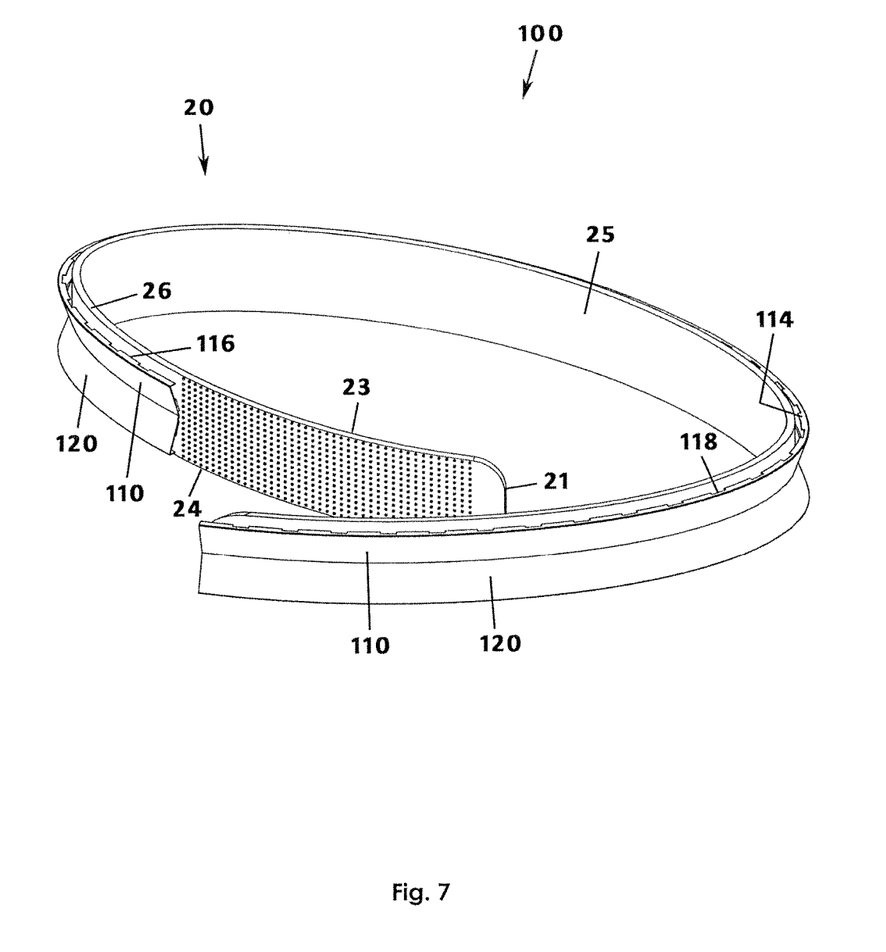
FIG. 7 is a perspective view of a tick trap belt according to another embodiment of the present invention, illustrated in an unfastened configuration.
Figure 8:
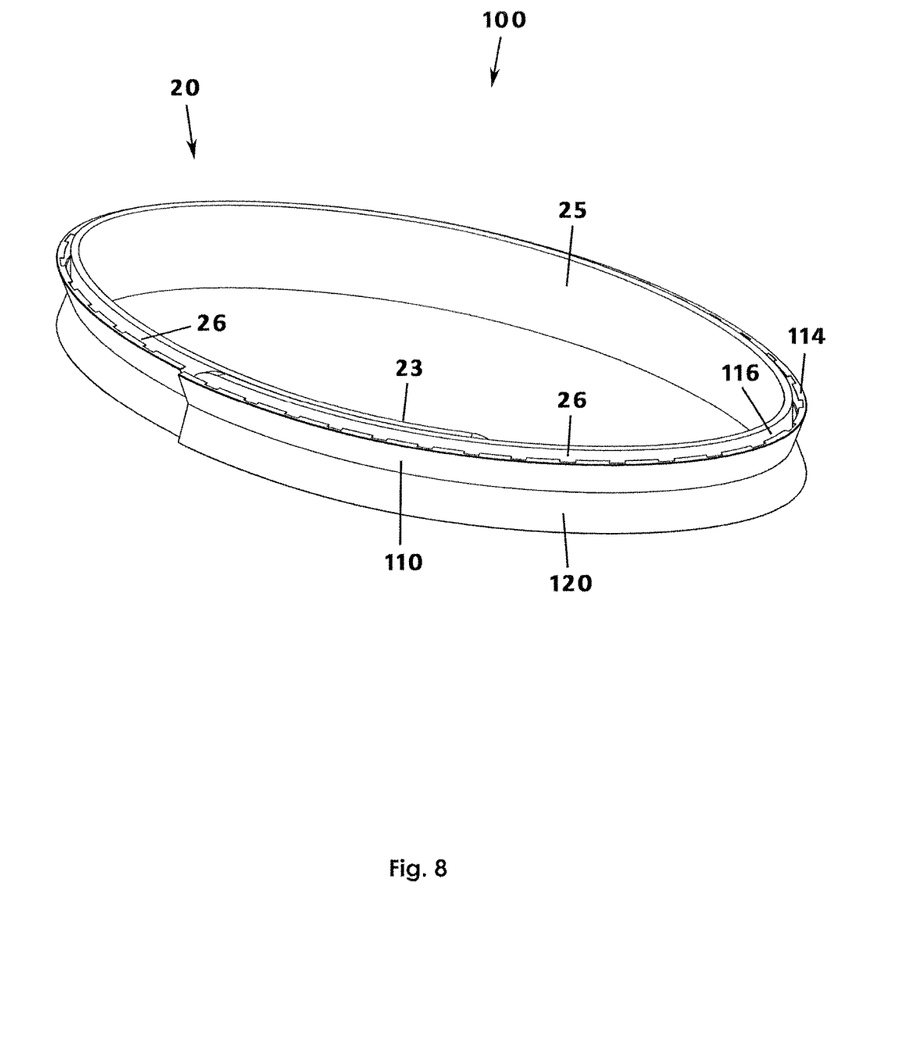
FIG. 8 is a perspective view of the tick trap belt as in FIG. 1, illustrated in a fastened configuration and with the awning in a closed or operational configuration.
Figure 9A:
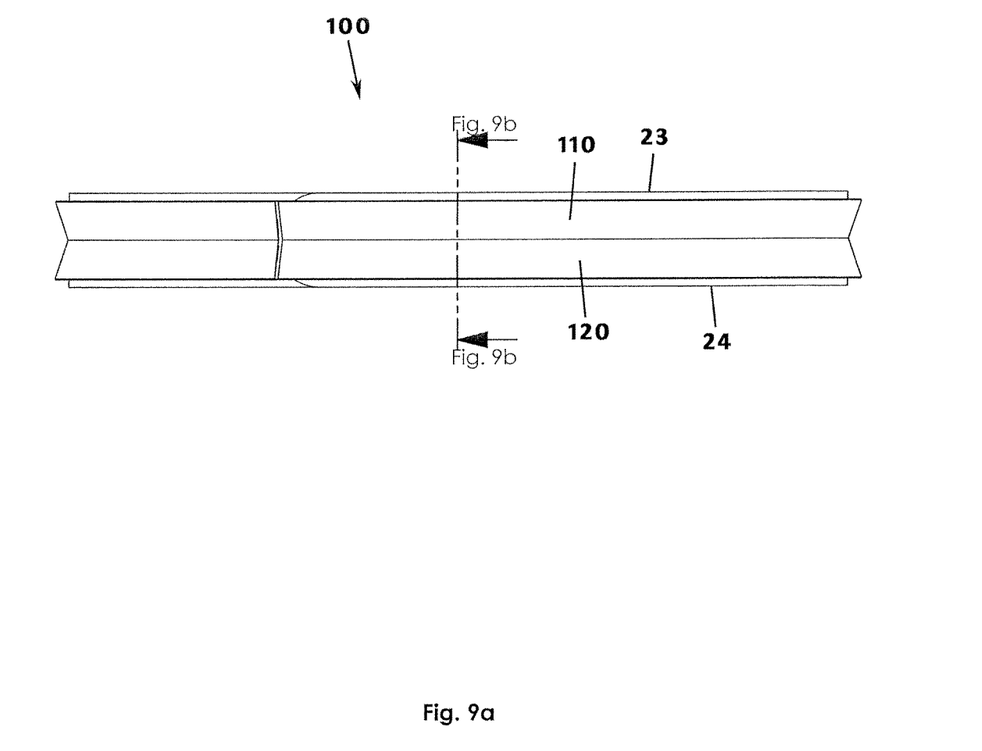
FIG. 9a is a side view of the tick trap belt as in FIG. 8.
Figure 9B:
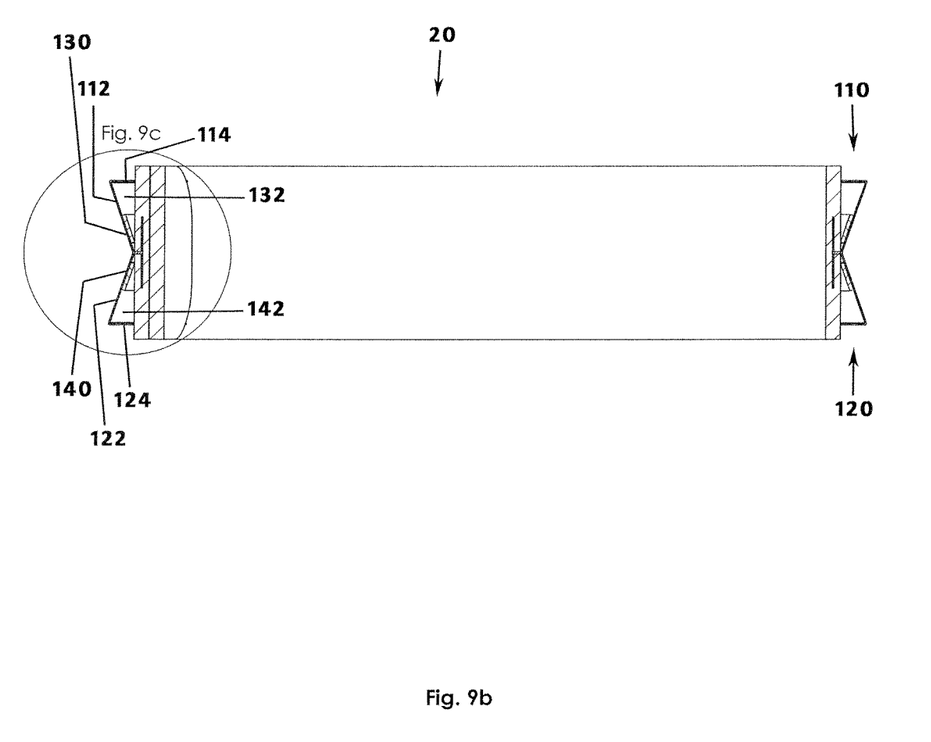
Figure 9C:
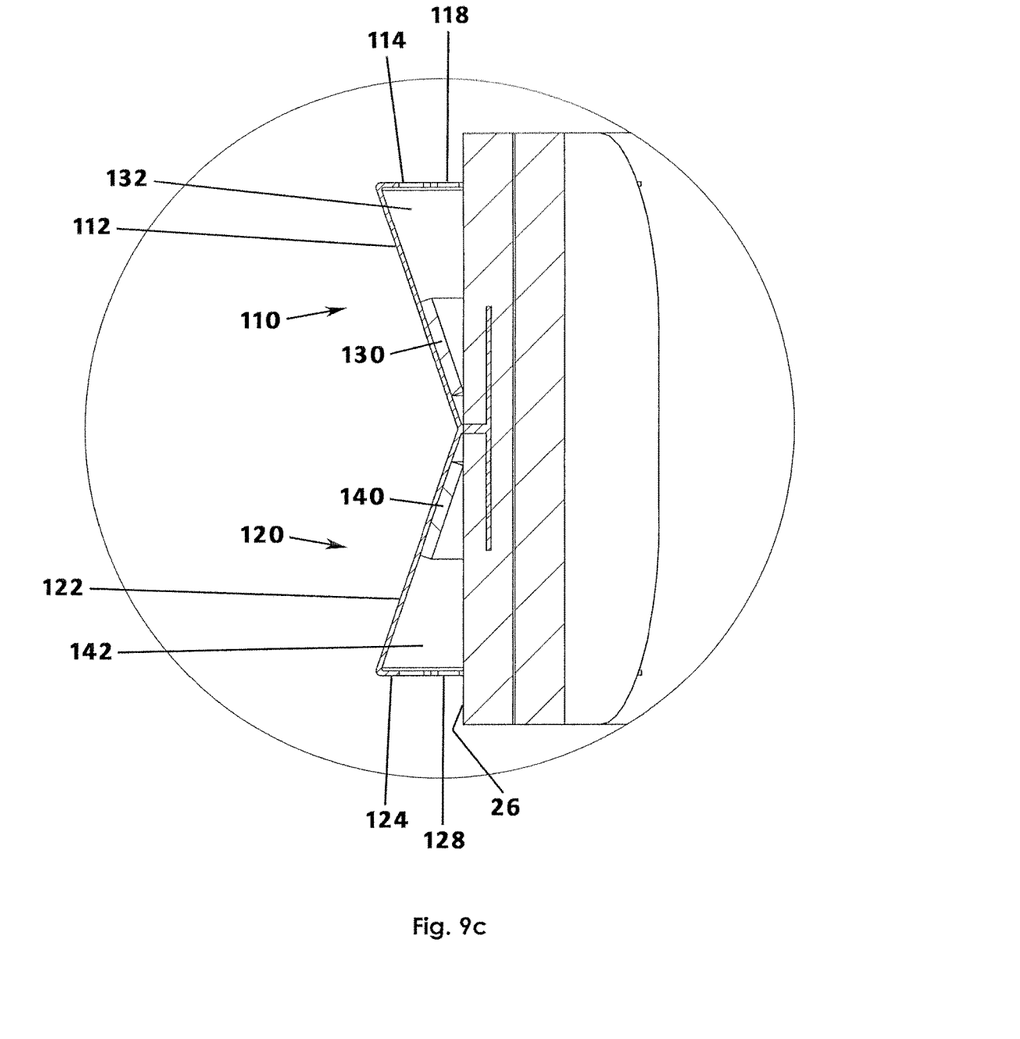
FIG. 9c is an isolated view on an enlarged scale taken from FIG. 9b.
Figure 10:
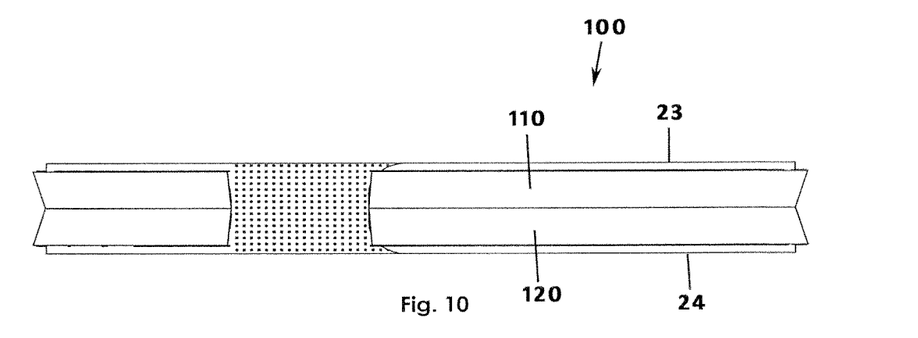
FIG. 10 is another side view of the tick trap apparatus as in FIG. 7.
Figure 11:
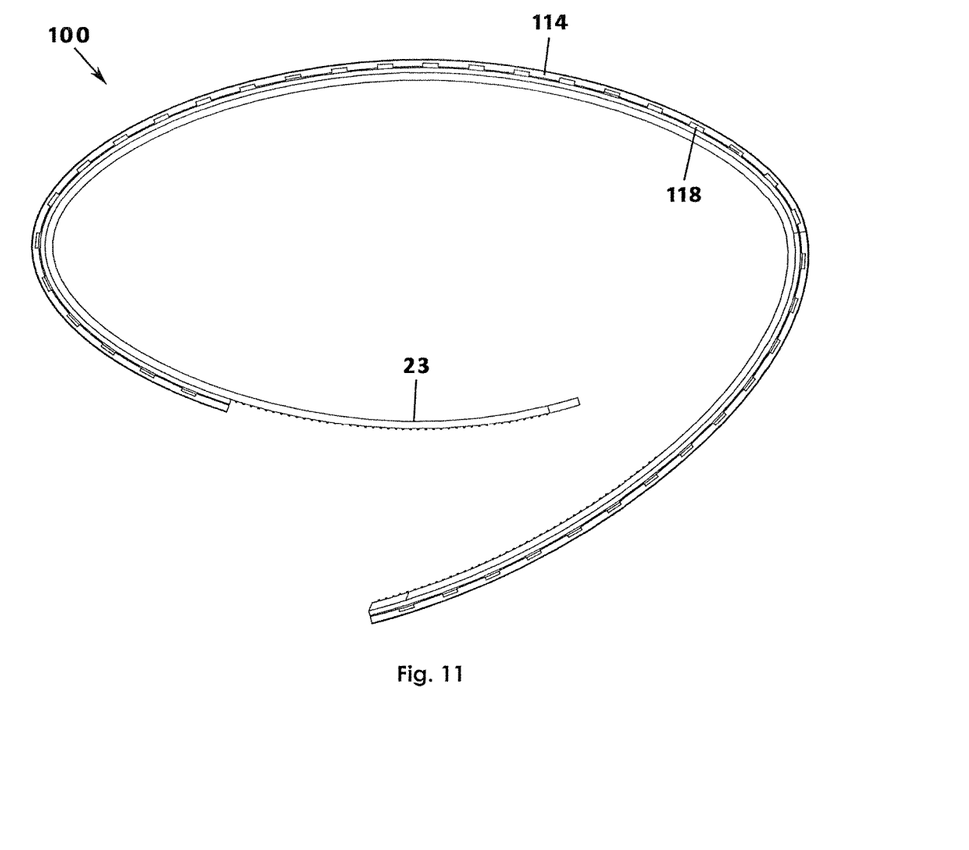
FIG. 11 is a top view of the tick trap apparatus as in FIG. 7.

A first awning portion 110 includes a first primary panel 112 and a first auxiliary panel 114 coupled to the first primary panel 112 at a predetermined angle, such as at a 90 5 degree angle. The first primary panel 112 may be fixedly attached to the outer surface of the belt and, specifically, may be attached to and extend from the belt 20 at the middle axis and may extend outwardly and upwardly towards the upper edge 23 of the belt 20. The first primary panel 112 may extend at a 45 degree angle so as to define a first gap area 132 as will be described later. Further, the first primary panel 112 includes a bottom surface on which a 10 first adhesive member 130 may be coupled. The first auxiliary panel 114 may extend outwardly to a first awning edge 116 that defines a plurality of first notches 118 spaced apart from one another (FIGS. 7 and 9c). Preferably, the first auxiliary panel 114 may be perpendicular to the first primary panel and be directed toward the outer surface of the belt 20. Preferably, the first awning edge 116 is not actually attached to the belt 20 although the 15 first auxiliary panel 114 and the first awning edge 116 may be proximate to and even bear against the outer surface of the belt 20 and resist being crushed, struck together, or the like. The first awning portion 110 may be constructed of a flexible material and be movable, such as by manipulation by a user's fingers, between open and closed configurations whereby to access and replace adhesive members, respectively.

Similarly, a second awning portion 120 includes a second primary panel 122 and a second auxiliary panel 124 coupled to the second primary panel 122 at a predetermined angle, such as at a 90 degree angle. The second primary panel 122 may be fixedly attached to the outer surface of the belt and, specifically, may be attached to and extend from the belt 20 at the middle axis and may extend outwardly and downwardly towards the lower edge 24 of the belt 20. The second primary panel 122 may extend at a 45 degree angle so as to define a second gap area 142 as will be described later. Further, the second primary panel 122 includes a bottom surface on which a second adhesive member 140 may be coupled. The second auxiliary panel 124 may extend outwardly to a second awning edge 126 that defines a plurality off second notches 128 spaced apart from one another. Preferably, the second auxiliary panel 124 may be perpendicular to the second primary panel 122 and be directed toward the outer surface of the belt 20. Preferably, the second awning edge 126 is not 10 actually attached to the belt 20 although the second auxiliary panel 124 and the second awning edge 126 may be proximate to and even bear against the outer surface of the belt 20 and resist being crushed, struck together, or the like. The second awning portion 120 may be constructed of a flexible material and be movable, such as by manipulation by a user's fingers, between open and closed configurations whereby to access and replace adhesive 15 members, respectively.

The first primary panel 112 has a first bottom surface that, together with the outer surface of the belt, defines a first gap area 132. Similarly, the second primary panel 122 has a second bottom surface that, together with the outer surface of the belt, defines a second gap area 142. Then, a first adhesive member 130 may be positioned and mounted to the first 20 bottom surface in the first gap area 132, such as in the apex defined thereby and as shown in FIG. 9c. Similarly, a second adhesive member 140 may be positioned and mounted to the second bottom surface in the second gap area 142, such as in the apex defined thereby and as shown in FIG. 9c. Further, a combined width of the first 110 and second 120 portions of the awning may be less than 50% a width between the upper 23 and lower 24 edges of the belt 20 or less than 20% a width between the upper 23 and lower 24 edges of the belt 20.

In use, the tick trap belt 100 results in ticks being stopped whether coming from above or below the beltline of an outdoorsman as described in detail above. Further, the tick trap belt 100 includes awning portions having structures (e.g. the auxiliary panels) that resist or prevent the awning portions from being crushed, stuck to the belt, or otherwise rendered useless through inadvertent activity. In addition, the notches defined by each auxiliary panel of the awning portion allow ticks to enter into respective gap areas even when the auxiliary panels may bear against the belt 20.

It is understood that while certain forms of this invention have been illustrated and described, it is not limited thereto except insofar as such limitations are included in the following claims and allowable functional equivalents thereof.

The invention claimed is:

1. A tick trap belt for wear by an outdoorsman for stopping upward movement of ticks, comprising:
   a belt strap having opposed ends, each end having a fastener such that said opposed ends of said belt strap are selectively coupled together about the outdoorsman's body;
   wherein said belt strap includes an upper edge and a lower edge opposite said upper edge and having opposed inner and outer surfaces extending between said upper edge and said lower edge, respectively;
   wherein said outer surface of surface of said belt strap defines an imaginary middle axis extending linearly between said opposed ends and along a middle point between said upper edge and said lower edge;
   an awning coupled to said outer surface of said belt strap at said imaginary middle axis and extending between said fasteners at said opposed ends of the belt strap, respectively, said awning comprising:
      a first awning portion having a first primary panel extending outwardly and upwardly from said imaginary middle axis and having a first auxiliary panel coupled to said first primary panel at a predetermined angle, said first auxiliary panel having a first awning edge proximate and unattached to said upper edge of said belt strap, and
      a second awning portion having a second primary panel extending outwardly and downwardly from said imaginary middle axis and having a second auxiliary panel coupled to said second primary panel at a predetermined angle, said second auxiliary panel having a second awning edge proximate and unattached to said lower edge of said belt strap;
   wherein said first awning portion has a first bottom surface, that in association with said outer surface of said belt strap, define a first gap area, and said second awning portion has a second bottom surface that, in association with said outer surface of said belt strap, define a second gap area;

wherein said first awning portion and said outer surface of said belt strap together have an inverted V-shaped configuration that defines said first gap area and said second awning portion and said outer surface of said belt strap together have an inverted V-shaped configuration that defines said second gap area;

a first adhesive member is positioned in said first gap area and a second adhesive member is positioned in said second gap area for stopping movement of ticks who step on said first and second adhesive members, said first and second adhesive members being coupled to at least one of said bottom surfaces of said first and second awning portions and said outer surface of said belt strap, respectively.

2. The tick trap belt as in claim 1, wherein:

said first awning edge defines a plurality of notches configured and operable to permit an insect to pass from said upper edge of said belt strap into said first gap area;

said second awning edge defines a plurality of notches configured and operable to permit an insect to pass from said lower edge of said belt strap into said second gap area.

3. The tick trap belt as in claim 1, wherein said first and second awning portions are constructed of a flexible material and are movable between closed configurations, respectively, in which said first and second adhesive members in said first and second gap areas, respectively, are not accessible and open configurations, respectively, in which said first and second adhesive members in said first and second gap areas, respectively, are accessible.

4. The tick trap belt as in claim 1, wherein: said belt strap is constructed of nylon; said adhesive member includes at least two forms of glue material attached to a substrate; said fasteners are hook and loop fasteners.

5. The tick trap belt as in claim 1, wherein said awning defines a width that is less than 50% a width between said upper edge and said lower edge of said belt strap.

6. The tick trap belt as in claim 1, wherein said awning defines a width that is 2 less than 20% a width between said upper edge and said lower edge of said belt strap.

7. The tick trap belt as in claim 1, wherein said adhesive member defines a width that is less than 20% a width of said awning.

8. A tick trap belt for wear by an outdoorsman for stopping upward movement of ticks, comprising:

a belt strap having opposed ends, each end having a fastener such that said opposed ends of said belt strap are selectively coupled together about the outdoorsman's body;

wherein said belt strap includes an upper edge and a lower edge opposite said upper edge and having opposed inner and outer surfaces extending between said upper edge and said lower edge, respectively;

wherein said outer surface of surface of said belt strap defines an imaginary middle axis extending linearly between said opposed ends and along a middle point between said upper edge and said lower edge;

an awning coupled to said outer surface of said belt strap at said imaginary middle axis and extending between said fasteners at said opposed ends of the belt strap, respectively, said awning comprising:

a first awning portion having a first primary panel extending outwardly and upwardly from said imaginary middle axis and having a first auxiliary panel coupled to said first primary panel at a predetermined angle that prevents said first primary panel from bearing against said outer surface of said belt strap, said first auxiliary panel having a first awning edge proximate and unattached to said upper edge of said belt strap, and a second awning portion having a second primary panel extending outwardly and downwardly from said imaginary middle axis and having a second auxiliary panel coupled to said second primary panel at a predetermined angle that prevents said second primary panel from bearing against said outer surface of said belt strap, said second auxiliary panel having a second awning edge proximate and unattached to said lower edge of said belt strap;

wherein:

said first awning portion has a first bottom surface that, in association with said outer surface of said belt strap, define a first gap area, and said second awning portion has a second bottom surface that, in association with said outer surface of said belt strap, define a second gap area;

said first awning portion and said outer surface of said belt strap together have an inverted V-shaped configuration that defines said first gap area and said second awning portion and said outer surface of said belt strap together have an inverted V-shaped configuration that defines said second gap area;

said first awning edge defines a plurality of notches configured and operable to permit an insect to pass from said upper edge of said belt strap into said first gap area;

said second awning edge defines a plurality of notches configured and operable to permit an insect to pass from said lower edge of said belt strap into said second gap area;

a first adhesive member is positioned in said first gap area and a second adhesive member is positioned in said second gap area for stopping movement of ticks who step on said first and second adhesive members, said first and second adhesive members being coupled to at least one of said bottom surfaces of said first and second awning portions and said outer surface of said belt strap, respectively.

9. The tick trap belt as in claim 8, wherein said first and second awning portions are constructed of a flexible material and are movable between closed configurations, respectively, in which said first and second adhesive members in said first and second gap areas, respectively, are not accessible and open configurations, respectively, in which said first and second adhesive members in said first and second gap areas, respectively, are accessible.

10. The tick trap belt as in claim 8, wherein said adhesive member includes at least two forms of glue material attached to a substrate.

11. The tick trap belt as in claim 8, wherein said awning defines a width that is less than 50% a width between said upper edge and said lower edge of said belt strap.

12. The tick trap belt as in claim 8, wherein said awning defines a width that is less than 20% a width between said upper edge and said lower edge of said belt strap.

13. The tick trap belt as in claim 8, wherein said adhesive member defines a width that is less than 20% a width of said awning.

14. The tick trap belt as in claim 8, wherein: said first primary panel and said first auxiliary panel of said first awning portion are crush resistant so as to protect said first adhesive member from damage; said second primary panel and said second auxiliary panel of said second awning portion are crush resistant so as to protect said second adhesive member from damage.

\* \* \* \* \*